L. J. WEATHERWAX.
VEHICLE STEERING MECHANISM.
APPLICATION FILED NOV. 28, 1914.
1,141,290.
Patented June 1, 1915.
3 SHEETS—SHEET 1.
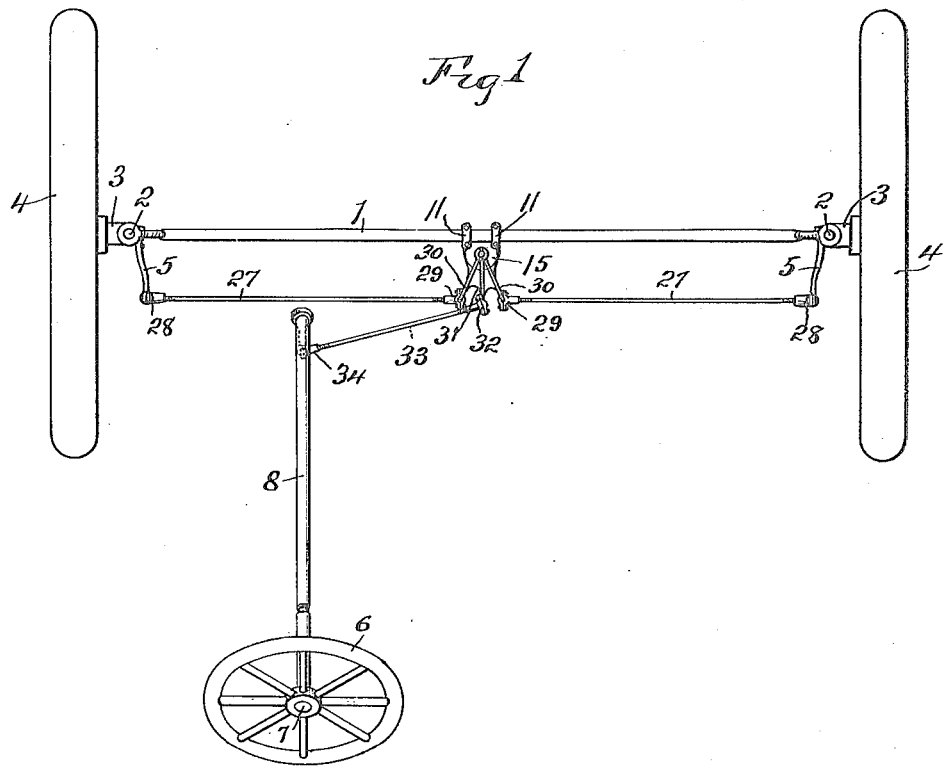
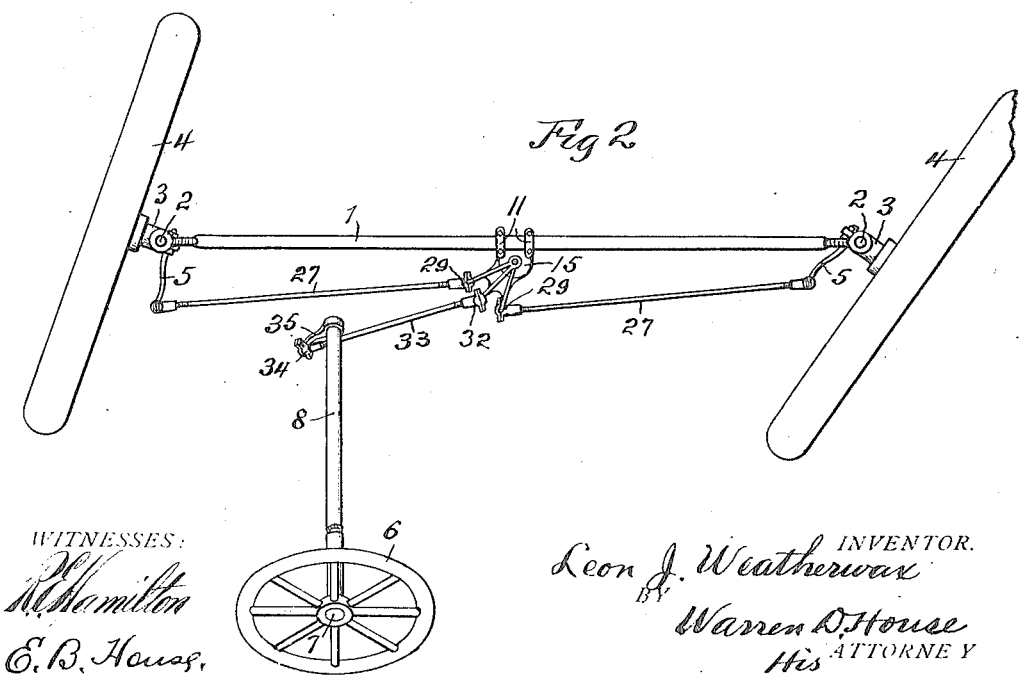
WITNESSES:
M. Hamilton
E. B. House.
INVENTOR.
Leon J. Weatherwax
BY Warren D. House
His ATTORNEY

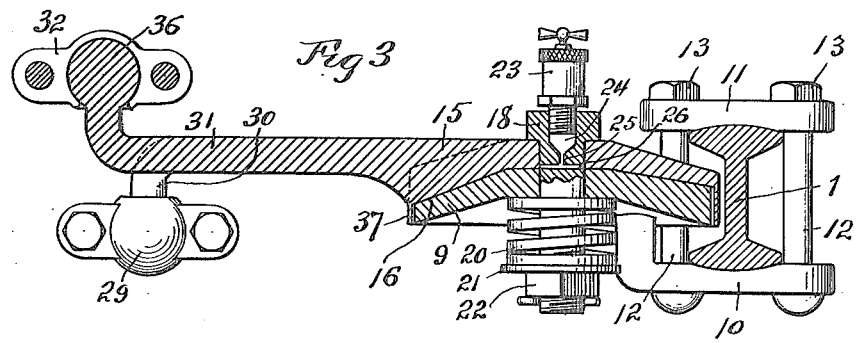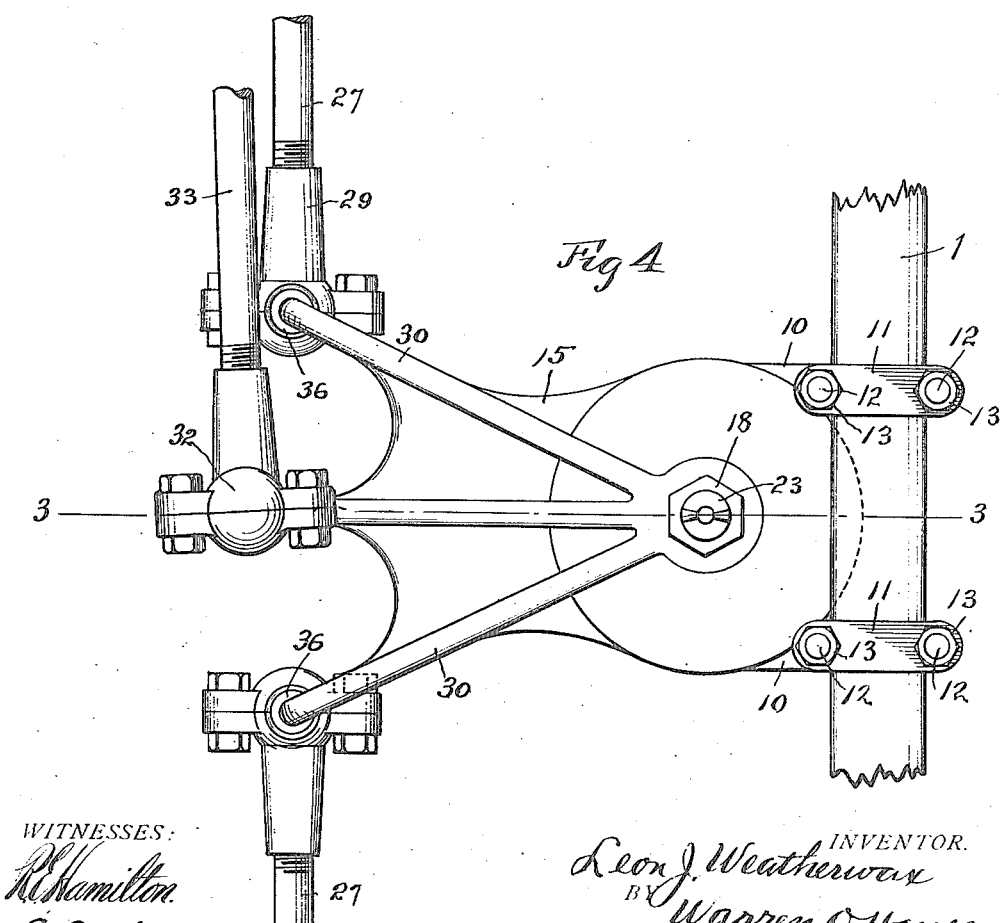

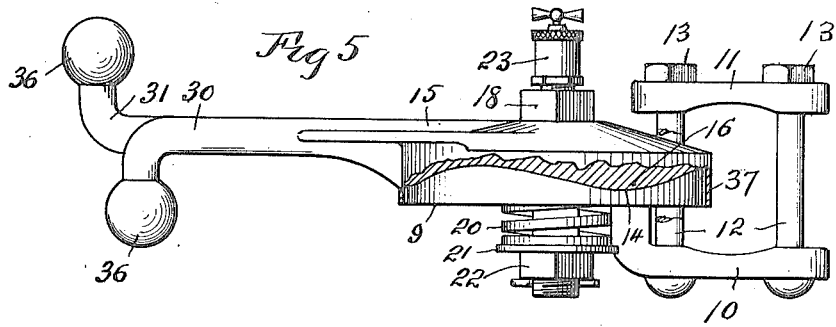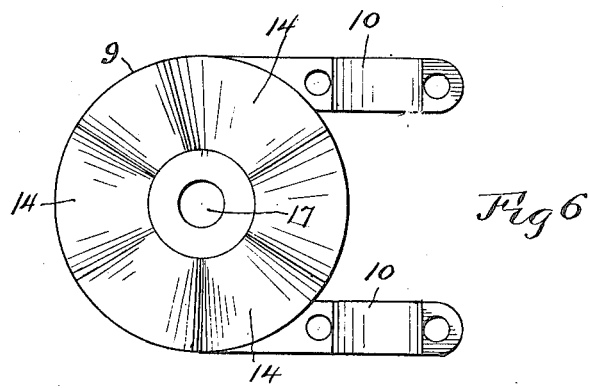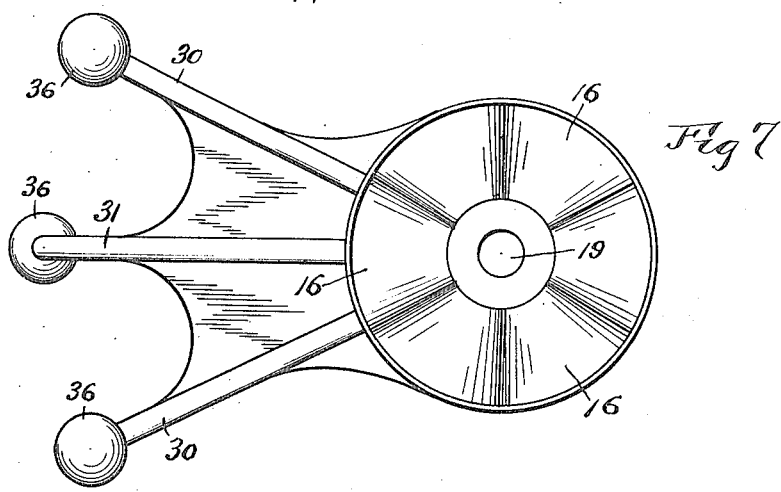

UNITED STATES PATENT OFFICE.

LEON J. WEATHERWAX, OF DE QUEEN, ARKANSAS.

VEHICLE STEERING MECHANISM.

1,141,290.  Specification of Letters Patent.  Patented June 1, 1915.

Application filed November 28, 1914. Serial No. 874,367.

*To all whom it may concern:*

Be it known that I, LEON J. WEATHERWAX, a citizen of the United States, residing at De Queen, in the county of Sevier and State of Arkansas, have invented a certain new and useful Improvement in Vehicle Steering Mechanisms, of which the following is a specification.

My invention relates to improvements in vehicle steering mechanisms.

One of the objects of my invention is to provide a steering mechanism, of novel construction, by means of which the pivoted spindles of the forward axle of an automobile or similar vehicle, may be respectively turned to positions approximately tangential to the curves along which the inner and outer wheels are designed to travel, when the vehicle is turned to the right or the left.

Another object of my invention is to provide novel means which tends to retain the forward pivoted spindles of the vehicle in longitudinal alinement with the axle to which they are pivoted, and which tends to return said spindles to said alined position when they have been turned from such position.

Other novel features of my invention are hereinafter fully described and claimed.

In the accompanying drawings, which illustrate the preferred embodiment of my invention, Figure 1 is a plan view of my improved steering mechanism showing the spindles in alinement with the front axle, a portion of the shaft of the steering wheel and its casing being broken away. Fig. 2 is a plan view of what is shown in Fig. 1, the parts being in the positions occupied by them when a turn is being made. Fig. 3 is an enlarged vertical sectional view on the line 3—3 of Fig. 4. Fig. 4 is an enlarged plan view of the oscillatable member and parts connected therewith. Fig. 5 is a view partly in side elevation and partly broken away of the oscillatable member, the bracket, and some of the parts connected therewith. Fig. 6 is a plan view of the bracket. Fig. 7 is a bottom view of the oscillatable member.

Similar reference characters designate similar parts in the different views.

1 designates a front axle of an automobile or similar vehicle having respectively pivoted to it at opposite ends, by vertical bolts 2, the usual spindles 3, having respectively mounted thereon the ordinary carrying wheels 4, and respectively provided with rearwardly and slightly inwardly extending steering arms 5.

The foregoing description applies to a usual construction, such as may be found upon automobiles now on the market.

6 designates the usual steering wheel or operating member which is secured to the upper end of a rearwardly and upwardly inclined shaft 7, which is pivotally mounted in a tubular casing 8 supported in the automobile body, not shown.

In the ordinary construction, the steering arms 5 are connected with each other by a single rod, which is moved lengthwise by a mechanism connected with the shaft 7. With such a construction, the inner forward wheel, in making short turns, does not assume a position sufficiently tangential to the curve the inner wheel is to travel, that is it does not assume an angle to the straight ahead line of travel sufficiently great to have the spindle on which it is mounted disposed radially with reference to the curve which is to be made by the wheel.

With my improved construction, on making short turns the wheels may be adjusted to positions in which they will be approximately respectively tangential with the curves along which they are to travel. To effect this function, the following described mechanism is provided. A bracket having a circular body portion 9 is provided, as shown in Fig. 6, with two forwardly extending arms 10, which are adapted to bear against the under side of the axle 1 near the middle thereof, as shown in Fig. 3. Extending through the arms 10 at opposite sides of the axle 1 are two pairs of vertical bolts 12, the heads of which bear against the under sides of the arms 10, said two pairs of bolts being extended respectively through two horizontal clamping plates 11 which bear against the upper side of the axle 1, and which are held clamped against the axle by nuts 13 respectively mounted on the bolts 12. The upper side of the body 9 of the bracket is preferably conoidal and provided with three radially arranged grooves 14, arranged at equal distances apart and provided with sides which converge toward the bottoms of the grooves. Pivotally mounted on the top of the body 9 of the bracket is an oscillatable member 15, the under side of which is provided with a conoidal service similar to the top of the body 9, and which is provided with three raised portions 16, which are respectively disposed and are adapted to fit in the grooves 14, when the oscillatable member 15 is in the medial position shown in Figs. 1, 3, 4 and 5. The body 9 is provided with a central vertical hole 17, Fig. 6, through which extends a vertical bolt 18, which also extends through a vertical hole 19 in the oscillatable member 15, upon which the head of the bolt 18 rests. Encircling the bolt 18 is a coil spring 20, the upper end of which bears against the under side of the body 9 of the bracket, and the lower end of which bears against a washer 21, which in turn is supported by a nut 22, which is mounted on the lower end of the bolt 18. The tension of the spring 20 yieldingly holds the oscillatable member 15 against the grooved upper side of the bracket, the converging sides of the grooves 14 of which, tend to normally force the oscillatable member 15 to the medial position shown in Figs. 1, 3 and 4.

In order that the bearing portions of the members 9 and 15 may be conveniently lubricated, I provide an oil cup 23 having a screw-threaded stem at its lower end, which is fitted in a screw-threaded central vertical hole 24, Fig. 3, provided in the upper end of the bolt 18. The hole 24 communicates by means of a central vertical passage 25 with a transverse hole 26 extending through the bolt 18 at a point intermediate of the contacting surfaces of the members 9 and 15.

Two rods 27 have their outer ends respectively connected by ball and socket joints 28 with the steering arms 5. The inner ends of the rods 27 are respectively connected by ball and socket joints 29 with two arms 30 which extend radially from the axis of and which are integral with the oscillatable member 15. The oscillatable member 15, intermediate of the arms 30 is provided with a radial arm 31 which is connected by a ball and socket connection 32 with a rod 33, the other end of which is connected by a ball and socket connection 34 with a crank 35 secured to the lower end of the shaft 7, Fig. 2. The arms 30 and 31 are provided with balls 36 which form a part of the ball and socket connections between said arms and the rods 27 and 33. The balls 36 with which the arms 30 are provided are disposed equidistant from the axis of the oscillatable member 15 and at equal distances respectively from a vertical plane at right angles to the axle 1 and in which the axis of the member 15 is located, when said member is in the medial position shown in Figs. 1 and 4. When the member 15 is in this position, said vertical plane bisects the ball 36 on the arm 31.

In the operation of my invention, when it is desired to turn the vehicle to the right, for example, the steering operating wheel 6 is turned clock-wise, thereby through the intermediacy of the shaft 7, crank 35, and rod 33, swinging the oscillatable member 15 clock-wise, from the position shown in Fig. 1 to that shown in Fig. 2.

The turning of the member 15 in the direction just described swings the spindles 3, through the intermediacy of the connecting rods 27. When the member 15 is turned clockwise, the right steering arm 5, together with its spindle 3, will be swung a greater distance than the other steering arm and spindle. The right wheel will, therefore, in turning to the right, be turned to a greater angle to the straight ahead line of travel than will the left wheel.

The farther the member 15 is turned from the medial position, the greater will be the distance traveled by the inner steering arm 5 relatively to the distance traveled by the outer steering arm 5. Thus the shorter the turn to be made, the greater will be the angle made by the inner wheel 4, relatively to that made by the outer wheel 4, with the straight ahead line of travel.

When turning to the left, the member 15 will be turned counter clockwise from the medial position, and the left steering arm will then be swung a greater distance than the right one, thereby giving the left wheel, which will then be the inner wheel, an angle to the straight ahead line of travel greater than that of the right and, at this time, the outer wheel.

When the operator releases the steering wheel 6, the coil spring 20, by means of the bolt 18 and by reason of the engagement of the member 15 with the grooved surface of the member 9, will tend to swing the oscillatable member 15 to the medial position, thereby swinging the spindles 3 and wheels 4 into positions adapted for straight ahead travel.

As shown in Figs. 3 and 5, the member 15 may be provided with a downwardly extending annular flange 37, which encircles the body 9 and serves to prevent dirt, moisture and dust from passing in between the bearing surfaces of the members 9 and 15.

I do not limit my invention to the structure shown and described, as modifications, within the scope of the appended claims, may be made without departing from the spirit of my invention.

Having thus described my invention, what I claim and desire to secure by Letters Patent, is:—

1. In a vehicle steering mechanism, the combination with an axle, of a bracket having a groove, the sides of which converge toward each other, the bracket being secured to said axle, an oscillatable member pivoted to said bracket and adapted when oscillated to alternately bear against the sides of said groove, yielding means for normally forcing said oscillatable member toward the bottom of said groove, two spindles pivoted to said axle, means connecting said oscillatable member and said spindles by which the spindles may be simultaneously swung, when the oscillatable member is swung, a steering operating member, and means actuated by said operating member for oscillating said oscillatable member.

2. In a vehicle steering mechanism, the combination with an axle, of a member secured thereto provided with an inclined surface, an oscillatable member pivoted to said member, and adapted when oscillated to move upwardly and downwardly upon said inclined surface, yielding means for normally forcing said oscillatable member downwardly on said inclined surface, two spindles pivoted to said axle, means for simultaneously swinging said spindles actuated by said oscillatable member, and means for oscillating said oscillatable member.

3. In a vehicle steering mechanism, the combination with an axle, of a member secured thereto having an inclined surface, an oscillatable member pivoted to said member and when oscillated movable upwardly and downwardly on said surface, a spring for normally forcing the oscillatable member downwardly on said inclined surface, two spindles pivoted to said axle, means actuated by said oscillatable member for simultaneously swinging said spindles, and means for oscillating said oscillatable member.

4. In a vehicle steering mechanism, the combination with an axle, of a member secured thereto having an inclined surface, an oscillatable member adapted when oscillated to move upwardly and downwardly on said inclined surface, a bolt pivotally connecting said members and upon which the oscillatable member is slidable, a coil spring encircling said bolt and normally forcing said oscillatable member against said inclined surface, two spindles pivoted to said axle, and means actuated by said oscillatable member for simultaneously swinging said spindles.

5. In a vehicle steering mechanism, the combination with an axle, of a member secured thereto having a groove with converging sides, an oscillatable member pivoted to said member and adapted when oscillated to alternately bear against said converging sides, yielding means for normally forcing said oscillatable member toward the bottom of said groove, two spindles pivoted to said axle, means actuated by said oscillatable member for simultaneously swinging said spindles, and means for oscillating said oscillatable member.

In testimony whereof I have signed my name to this specification in presence of two subscribing witnesses.

LEON J. WEATHERWAX.

Witnesses:
  E. D. STUART,
  H. S. SHAW.